United States Patent [19]

Simon

[11] Patent Number: 5,417,562
[45] Date of Patent: May 23, 1995

[54] METHOD AND APPARATUS FOR HANDLING EXTRUDED GREEN BRICKS

[75] Inventor: Helmut Simon, Krumbach, Germany

[73] Assignee: Hans Lingl GmbH & Co., Neu-Elm, Germany

[21] Appl. No.: 795,049

[22] Filed: Nov. 20, 1991

[30] Foreign Application Priority Data

Nov. 27, 1990 [DE] Germany .................. 40 37 593.5

[51] Int. Cl.$^6$ ............... B28B 11/16; B65G 47/244
[52] U.S. Cl. .................... 425/308; 198/374; 264/58; 264/571; 264/148
[58] Field of Search .............. 264/58, 39, 571, 101, 264/145, 148, 157, 297.4, 297.9; 198/374; 425/308, 315

[56] References Cited

U.S. PATENT DOCUMENTS

| | | | |
|---|---|---|---|
| 1,773,827 | 8/1930 | Therrien | 264/58 |
| 2,138,851 | 12/1938 | Gates | 264/58 |
| 3,402,834 | 9/1968 | Kelsey | 264/58 |
| 3,468,998 | 9/1969 | Lingl | 264/148 |
| 3,478,896 | 11/1969 | Pearne | 264/58 |
| 4,205,742 | 6/1980 | Thomas et al. | 198/374 |
| 4,211,130 | 7/1980 | Buckner et al. | 198/374 X |
| 4,214,655 | 7/1980 | Bernham et al. | 198/374 |
| 4,342,531 | 8/1982 | Cox et al. | 198/374 X |
| 4,522,292 | 6/1985 | Euverard et al. | 198/374 |
| 4,917,838 | 4/1990 | Rensen | 264/39 |

FOREIGN PATENT DOCUMENTS 2921705 12/1980 Germany .............. 264/138

*Primary Examiner*—Jan H. Silbaugh
*Attorney, Agent, or Firm*—Nixon & Vanderhye

[57] ABSTRACT

After extrusion, cutting, and tilting 90° alternate green bricks are rotated 180° about a vertical axis to form brick pairs with the back (unfinished) sides of both bricks facing each other. These reoriented brick pairs are then gripped and stacked. Conventional grippers, such as a vacuum gripper, may be used to grip only the backs of each brick in the pair. In this way, all of the finished faces of the stacked bricks avoid damage while simultaneously being more uniformly exposed to the kiln drying and firing atmosphere and thus may achieve a more uniform appearance. No special tools are required to handle irregular or specially designed brick faces because the gripper grips only the back of each brick pair.

11 Claims, 1 Drawing Sheet

METHOD AND APPARATUS FOR HANDLING EXTRUDED GREEN BRICKS

FIELD OF THE INVENTION

The present invention relates to a method and apparatus for producing and handling green bricks, and in particular, for ensuring that the faces of the bricks are not damaged during handling and that such faces are subjected to more uniform conditions during subsequent drying and firing steps in the brick manufacturing process.

BACKGROUND OF THE INVENTION

The process of manufacturing bricks can be divided into at least three distinct stages: (1) manufacture and extrusion of uncured or "green" brick material; (2) cutting of the extruded brick material into green bricks; and (3) drying and firing of the green bricks. These brick formation and handling stages are usually carried out using automated machinery and handling equipment. In conventional prior art brick handling systems, green bricks cut from extruded brick material are positioned on a conveyor system to be delivered to a stacking or loading station where they are stacked on kiln cars for drying and firing.

Green bricks are typically set upon the conveyor in the same direction and orientation. When pairs of these similarly oriented bricks are gripped for stacking, the finished face of one brick in the pair is oriented towards the unfinished back of the other paired brick. Those bricks which have their finished faces oriented towards the interior of a stack of bricks are not exposed to the same drying and firing atmosphere as other bricks. Thus, during the drying and firing process, which often occurs in a reduced pressure environment, this face-to-back orientation of stacked pairs of bricks typically produces inconsistent drying and firing patterns. As a result, undesirable variances in color and color pattern may result on the faces of different bricks.

For purposes of assisting in the subsequent description of brick handling and orientation, a front view of a brick 10 is shown in FIG. 1. The brick 10 is generally of rectangular shape having a longitudinal front face 11 and two transverse side faces 12a and 12b. For ornamental bricks, the brick faces 11, 12a, and 12b may also include ornamental designs or irregular shapes such as that indicated by reference numeral 15. The longitudinal back side of the brick 13 is typically a flat surface. Finally, the brick 10 includes two parallel cut sides 14. Perpendicular to the cut sides 14 and running through the brick 10 may be coring holes 16, honeycomb patterns, or other specialized features.

According to prior art handling methods, a gripping mechanism, such as a vacuum gripper, grips the bricks in pairs to remove them from the conveyor and to stack them for drying and firing. In stacking green bricks, each brick should contact other bricks in the stack on one of the cut faces 14. Otherwise, undesirable marks and irregular patterns may appear on the brick faces. Unfortunately, in order to stack bricks in this fashion, a gripper often must contact a finished face of at least one of the bricks in the pair leaving undesirable marks on the brick face.

This problem is particularly troublesome where ornamental or irregular features are included on the faces of the bricks. In that case, expensive manual handling is necessary to handle such ornamentally designed brick faces. But even in situations where bricks might be gripped on their cut sides, complicated and expensive gripping apparatus are still required to handle bricks which may be cored or honeycombed and to prevent the faces of the bricks from touching.

There is need to provide a brick handling system which can utilize conventional and simple gripping tools and still obtain faultless brick faces of more uniform color and pattern. In addition, it would be desirable if that system could handle irregular or specialized bricks without requiring specialized gripping tools or stacking procedures.

SUMMARY OF THE INVENTION

The present invention provides a method and apparatus for effectively and inexpensively adapting conventional brick handling systems to solve the problems and remove the drawbacks described above. Once the extruded brick material is cut into individual green bricks and placed in uniform orientation and direction onto a conveyor belt, alternate bricks are reoriented in the conveyor stream. More particularly, alternate bricks (set onto the conveyor on a cut side) are rotated (about a vertical axis) by 180°. As a result, the bricks travelling onward down the conveyor belt are divided into handling pairs with unfinished back sides 13 of each brick pair adjacent each other.

In this orientation, a conventional vacuum gripper mechanism can be used to simultaneously grip the back sides 13 of each brick pair while removing that pair from the conveyor to a stacking location (e.g. on a kiln car). The vacuum gripper cannot leave any undesirable marks in the face of the bricks (since it does not even contact a finished brick face). Furthermore, the brick pairs may be stacked with all of finished brick faces 11, 12a, and 12b being exposed more uniformly to the kiln firing atmosphere. In addition, conventional vacuum-type grippers can readily grip ornamental or specialized bricks having irregular designs on the brick faces or coring/honeycombs passing through the cut surfaces 14 of the bricks.

BRIEF DESCRIPTION OF THE DRAWINGS

These and other features and advantages of the present invention will be readily apparent to one of ordinary skill in the art from careful study of the following written description, read in conjunction with the drawings, in which like reference numerals are used to identify like parts throughout the drawings.

DETAILED DESCRIPTION OF THE EXEMPLARY EMBODIMENT

Figure 1:
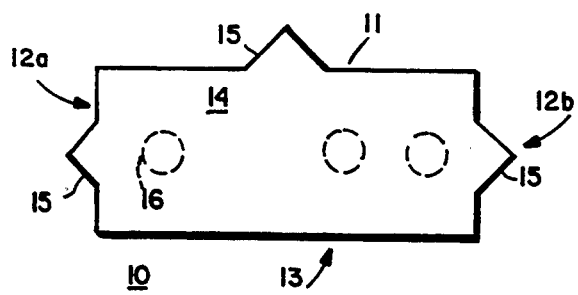
FIG. 1 is front view of a conventional typical ornamental brick.
Figure 2:
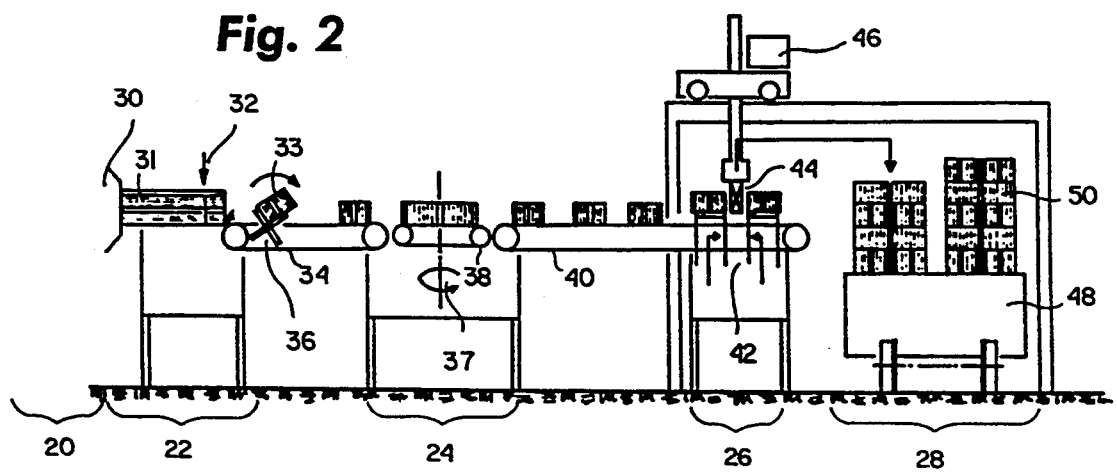
FIG. 2 is a side view of an automated brick handling assembly line modified according to the present invention.
Figure 3:
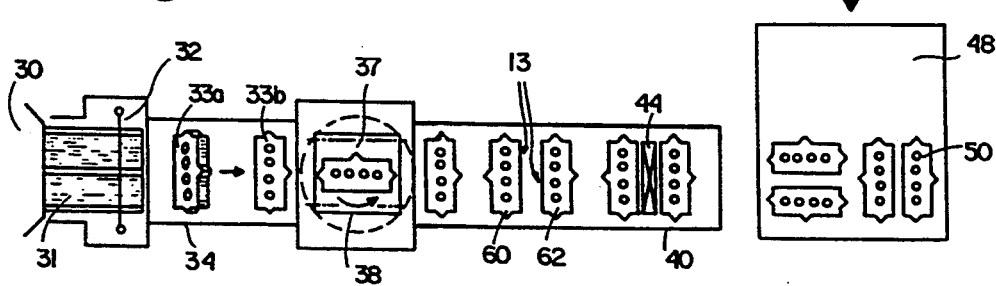
FIG. 3 is a top view of the automated brick handling assembly system shown in FIG. 2.

Referring to FIGS. 2 and 3, side and top views respectively, of an exemplary embodiment of the present invention are shown. The assembly line is divided into five work stations 20, 22, 24, 26 and 28, where each work station performs a separate brick handling operation. At work station 20, a conventional brick extrusion device 30 produces extruded brick material 31. The extruded brick material received at the work station 22 is conventionally cut into individual green bricks 33 using a conventional cutting device 32 such as a wire. Individual bricks are turned 90° about a horizontal axis onto conveyor 34 which connects work station 22 to the work station 24. As extruded and cut, the longitudinal axis of each brick is perpendicular to the longitudinal axis of conveyor 34, and the unfinished back side 13 of the brick rests on the conveyor surface. A cross-shaped tilting device 36 integrated with conveyor 34 receives individual bricks and rotates each brick 90° around its longitudinal axis so that a cut surface 14 of the brick 10 now rests on moving conveyor 34. Each rotated brick lying flat on the conveyor 34 is positioned in the same orientation so that the front face 11 of a brick 33a faces the back side 13 of a preceding brick 33b.

Each tilted brick is received at work station 24 which is capable of rotating every second brick 180° about a vertical axis. For example, it may include a conveyor 38 and a rotating mechanism 37. The rotating mechanism 37 may be, for example, a switchable apertured conveyor with an interspersed platform structure that can lift, turn, and lower a brick back onto the conveyor. It may also include a bidirectional conveyor having a motor-controlled base support which can be controlled to selectively rotate the conveyor 38 by 180° in the conveyor plane and then reverse its conveying direction to continue delivery of the bricks. However effected, a selected brick on conveyor 38 (e.g. every alternate brick) may be rotated 180° about a vertical axis. After such rotation, the front face 11 of the rotated brick is directed towards the work station 22.

A suitable control mechanism responsive to each second brick production is activated to initiate rotation of every other brick. Such 180° rotation of alternate bricks creates brick pairs 60,62 which travel together with opposite relative orientations onward down the conveyor line. The control mechanism could include, for example, a mechanical or electrical brick detecting sensor with a lost motion of 1:2 frequency divider to generate suitably timed control signals for effecting the necessary 180° rotation of alternate bricks.

Figure 4:
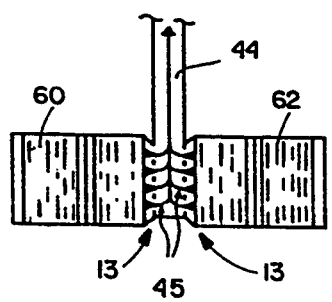
FIG. 4 shows a more detailed illustration of the vacuum gripper of FIGS. 1 and 2 in the act of gripping the backsides 13 of a pair of green bricks.

The brick pairs 60,62 are received on conveyor 40 for delivery to work station 26. Lifting mechanism 42 lifts the brick pair to a height that coincides with gripping mechanism 44. Gripping mechanism 44 may be, for example, a conventional vacuum gripper having double sided suction grips, indicated generally at 45 in FIG. 4, for gripping the back sides 13 of each brick in brick pair 60,62. Once gripped, the brick pair is removed from lifting mechanism 42 by conventional transfer device 46 connected to gripper 44 and transferred to a kiln car 48. Transfer device 46 is rotatable and conventionally controlled to alternately stack the brick pairs in a first orientation and a second transverse orientation. The brick stacks 50 are then ready for kiln drying and firing. Of course, it is also possible to provide a transfer device having a plurality of separately turnable vacuum grippers in order to build a plurality of brick piles simultaneously.

As illustrated in FIGS. 2 and 3, the present invention ensures that brick pairs in each brick stack 50 are oriented so that every brick face 11, 12a, and 12b faces outwardly from the core of its brick stack 50. Thus, all brick faces are exposed to a more uniform kiln drying-/firing atmosphere and more uniform brick face color and color patterns are achieved. Of course the cut sides 14 and back side 13 receive more limited exposure to the drying and firing environment. Moreover, because the gripper mechanism 44 only grips the back side 13, brick faces 11, 12a, and 12b are not marked. In this way, the present invention readily transports, grips, and stacks bricks having irregular or ornamental designs on the faces of the bricks or special coring/honeycombing in the cut sides of brick using the same conventional gripping mechanism used to handle bricks with plain faces and solid bodies. Consequently, the present invention requires no specialized gripping equipment or other adaptation to handle irregular and designed bricks.

Although an exemplary embodiment of the present invention is illustrated in the drawings and described, it will be understood by those skilled in the art that the present invention is not limited to the exemplary embodiment disclosed but is capable of rearrangement, modification, substitution of the parts and elements without departing from the spirit and scope of the invention.

What is claimed is:

1. A method for handling bricks, each brick having generally parallel finished and unfinished faces, said method comprising:
   receiving a sequence of bricks having a first orientation where finished faces of bricks are directed towards unfinished faces of other bricks, and
   moving alternate ones of said bricks to a second orientation to form brick pairs having an unfinished face of one brick directed towards the unfinished face of the other brick in the brick pair.

2. The method according to claim 1, further comprising:
   gripping the inwardly directed unfinished faces of each brick in the pair, and
   stacking said brick pairs on top of one another for drying and firing.

3. The method according to claim 2, wherein all finished faces of the stacked bricks are outwardly directed and thus exposed for more even drying and firing.

4. The method according to claim 2, wherein each alternately stacked pair of bricks is rotated about a vertical axis.

5. A system for manufacturing bricks with parallel finished face and unfinished faces, said system comprising:
   extrusion means for extruding brick material;
   cutting means for cutting the brick material into green bricks;
   conveyor means for transporting said cut bricks;
   means for reorienting alternate bricks on said conveying means so that the unfinished faces of each brick in each successive brick pair are directed toward each other; and
   gripping means for gripping the bricks in each brick pair at their respective unfinished faces and loading each brick pair onto a platform in a predetermined stacking pattern.

6. The system according to claim 5, wherein the gripping means comprises a rotatable vacuum gripper.

7. The system according to claim 5, wherein the finished faces of each brick include irregular designs.

8. The system according to claim 5, further comprising:

tilting means for receiving green bricks from the cutting means and for setting a cut side of the received bricks onto the conveyor means.

9. The system according to claim 5, wherein said predetermined stacking pattern directs all finished faces of the brick pairs outwardly for contact with drying and firing atmospheres.

10. The system according to claim 5, wherein the gripping means includes means for rotating alternate brick pairs by 90° to achieve the predetermined stacking pattern.

11. The system according to claim 5, wherein the means for reorienting includes a rotatable conveyor which rotates alternate bricks by 180° about a vertical axis.

* * * * *